United States Patent [19]
Masuda et al.

[11] Patent Number: 6,164,700
[45] Date of Patent: Dec. 26, 2000

[54] SEAT BELT PRETENSIONER DEVICE

[75] Inventors: Kou Masuda; Hiroyoshi Yamaguchi; Eiji Shimizu; Takeshi Ito; Tomoharu Ohi, all of Yokohama; Toshiki Takahashi, Wako, all of Japan

[73] Assignees: NHK Spring Co., Ltd.; Honda Giken Kogyo Kabushiki Kaisha, both of Japan

[21] Appl. No.: 09/295,737

[22] Filed: Apr. 20, 1999

[30] Foreign Application Priority Data

Apr. 20, 1998 [JP] Japan .................................. 10-109044

[51] Int. Cl.⁷ .................................................. B60R 22/36
[52] U.S. Cl. ........................................ 280/806; 297/480
[58] Field of Search ........................... 280/806; 297/480; 60/632, 635, 637, 638

[56] References Cited

U.S. PATENT DOCUMENTS

| | | | |
|---|---|---|---|
| 4,458,921 | 7/1984 | Chiba et al. | 280/806 |
| 5,350,194 | 9/1994 | Fohl | 280/805 |
| 5,403,037 | 4/1995 | Fohl | 280/806 |
| 5,984,357 | 11/1999 | Yasuda et al. | 280/806 |

Primary Examiner—Paul N. Dickson
Assistant Examiner—Faye M. Fleming
Attorney, Agent, or Firm—Skjerven Morrill MacPherson LLP

[57] ABSTRACT

In a pretensioner device for automatically increasing a tension of a seat belt in case of a vehicle crash which uses a piston and cylinder arrangement as a power generator, a spring member resiliently urges the piston assembly in the direction of actuation so that any play that may be present in each connecting potion of the path of power transmission can be eliminated. Therefore, collision between component parts at the time of activating the power generator can be prevented, and the loss of energy which could arise from such collision can be avoided. The piston assembly may comprise a piston main body slidably received in the cylinder, and a piston rod having a base end abutting an opposing end of the piston main body and a free end projecting out of the open free end of the cylinder while the cylinder is provided with an inwardly directed radial flange for preventing the piston main body from being projected out of the cylinder. Thus, the piston rod may be kept removed from the assembly during transportation and storage so that an inadvertent activation of the power generator would only cause the movement of the piston main body inside the cylinder, and the handling of the assembly can be therefore simplified.

6 Claims, 4 Drawing Sheets

(a)

(b)

(c)

(d)

SEAT BELT PRETENSIONER DEVICE

TECHNICAL FIELD

The present invention relates to a pretensioner device for automatically increasing the tension of an automotive seat belt.

BACKGROUND OF THE INVENTION

An automotive seat is normally equipped with a seat belt for restraining the vehicle occupant from being thrown forward in case of a vehicle crash or the like. Also, a seat belt is normally equipped with an emergency locking retractor (ELR) device which would not restrain the motion of the vehicle occupant under normal conditions but locks up the winding shaft for the seat belt only in case of a sudden stop or a vehicle crash. The ELR device is capable of locking up the winding shaft in a very short time period upon detecting a deceleration level higher than a prescribed value, and thereby prevents the seat belt from being pulled out any further.

However, even when the winding shaft is locked up, it is still not possible to prevent the seat belt from being pulled out by a certain amount due to the tightening of the part of the seat belt wound around the winding shaft. In view of this fact, various pretensioner devices have been proposed which rapidly moves the buckle connected to the seat belt in the direction to tension the seat belt, and thereby increases the restraining force of the seat belt even further (see U.S. Pat. No. 4,705,296). A pretensioner device is normally equipped with a reversing preventing device typically consisting of a ratchet device or a one-way clutch, separate from that for the ELR device, to prevent the buckle from reversing its motion.

Such pretensioner devices may use high pressure gas produced from a chemical reaction as a power generator for pulling the buckle, as proposed in U.S. patent application Ser. No. 08/847,272 now U.S. Pat. No. 5,984,357 issued on Nov. 16, 1999, which is assigned to one of the assignees (applicants) of the present application.

A conventional power generator 30 using high pressure gas is illustrated in FIG. 7. A cylinder 31 fixedly secured to a base member of a seat internally defines an inner bore 31a having a reduced diameter portion 31b at an intermediate part thereof, and receives a piston 32 from a base end thereof. A free end 32a of the piston 32 which is integrally attached to the main part, for instance, via a screw thread projects from an open end of the cylinder 31 and engages a buckle via a link member or the like. The base end 32b of the piston 32 is provided with a somewhat larger diameter, and engages the inner circumferential surface of the cylinder 31 via an O-ring 33. The open end of the cylinder 31 is tightly fitted with a cap 34 having a central opening 34a. This opening 34a slidably engages an intermediate part of the piston 32, and provides a bearing surface for the piston rod as the piston 32 moves.

The other end of the inner bore 31a of the cylinder 31 receives a gas generator 35 which includes a propellant and an ignition fuse. The open rear end of the cylinder 31 is crimped over a retaining plate 37 which retains the gas generator 35 and serves also as a seal.

According to this structure, the assembly is completed with the cylinder 31 fully received in the inner bore 31a as illustrated in FIG. 7. However, if the gap L between the base end portion 32b of the piston 32 and a shoulder surface of the reduced diameter portion 31b is too small, it may not be possible properly accommodate the cumulative dimensional errors of the component parts of the pretensioner device (for instance, the connecting portion of the link member, and the cylinder retaining portion with respect to the base member), and the positional errors of the link member. Also, when there is a play in the connecting portion between the free end portion 32a of the piston 32 and the link member, and the connecting portion between the link member and the buckle, successive collisions may occur in the connecting portions upon activation of the gas generator 35 due to the presence of a play in each connecting portion, and the resulting impacts may produce localized plastic deformations in various parts. Such deformation could lead to the loss of the energy of the high pressure gas. Therefore, the gas generator 35 is required to be larger than desired for ensuring a sufficient drive force for the buckle, and the power generator 30 tends to be larger than desired.

According to this structure, the power generator 30 is transported and stored typically with the piston 32, the cylinder 31 and the gas generator 35 assembled together. If the gas generator 35 is inadvertently activated in such a state, the piston 32 will be projected at high speed, and proper measures are therefore required to be taken for storage and transportation. This means a reduced space efficiency, and an increase in the time required for assembly. Also, because the piston 32 is relatively massive, the cap 34 is required to be strong enough to prevent the piston 32 from being projected from the open end of the cylinder 31 in case of an inadvertent activation of the gas generator 35, and the power generator inevitably becomes bulky and massive.

BRIEF SUMMARY OF THE INVENTION

In view of such problems of the prior art, a primary object of the present invention is to provide a seat belt pretensioner device powered by a cylinder device incorporating a gas generator which is reliable in use and easy to manufacture.

A second object of the present invention is to provide a seat belt pretensioner device powered by a cylinder device incorporating a gas generator which is simple in structure and compact in size.

A third object of the present invention is to provide a seat belt pretensioner device powered by a cylinder device incorporating a gas generator which is easy to handle.

According to the present invention, such objects can be accomplished by providing a pretensioner device for automatically increasing a tension of a seat belt in case of a vehicle crash by moveably supporting a seat belt buckle, moving the buckle in the direction to tension the seat belt with a power generator, and preventing a reversing movement of the buckle with a reversing preventing device, wherein the power generator comprises: a fixed cylinder, a piston assembly which is received in the cylinder and projects from an open free end of the cylinder at a free end thereof to either directly or indirectly engage the buckle; a gas generator received in a base end of the cylinder remote from the open free end for selectively and rapidly increasing the inner pressure of the cylinder; and a spring member which resiliently urges a part of the piston assembly in a direction of actuation of the piston assembly.

Because the piston member is resiliently urged in the direction to project, the dimensional errors of the component parts and the positional errors that may occur during assembly can be readily absorbed, and the assembly work is simplified. Also, once fully assembled, the play that may exist between the component parts can be absorbed so that the collision of adjacent parts in the power transmission mechanism can be avoided, and the energy loss of the high pressure gas can be minimized. This allows the device to be compact and light-weight as a whole. Preferably, the cylinder comprise an annular collar fitted inside the cylinder, and the spring member comprises a compression coil spring interposed between an annular shoulder defined by the annular collar and a base end of the piston assembly.

Additionally, if the piston assembly consists of a piston main body which is adopted so as not to project from the cylinder even after activation, and a piston rod which has a base end detachably engaging the piston main body from the open one end and a free end engaging the buckle, the handling of the device can be improved because the power generator can be handled for storage and transportation without installing the piston rod, and the inadvertent actuation of the gas generator for any reason merely causes the piston main body to move within the cylinder. The open free end of the cylinder preferably comprises an inwardly directed radial flange which prevents removal of the piston main body from the open free end of the cylinder. This inwardly directed radial flange may additionally provide a bearing surface for the piston rod. In particular, if the piston main body and the piston rod abut each other via a coaxial concave surface and a coaxial convex surface having a smaller curvature than the concave surface, the piston rod and the piston main body can be automatically aligned with each other, and the tilting of the piston rod can be effectively prevented.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
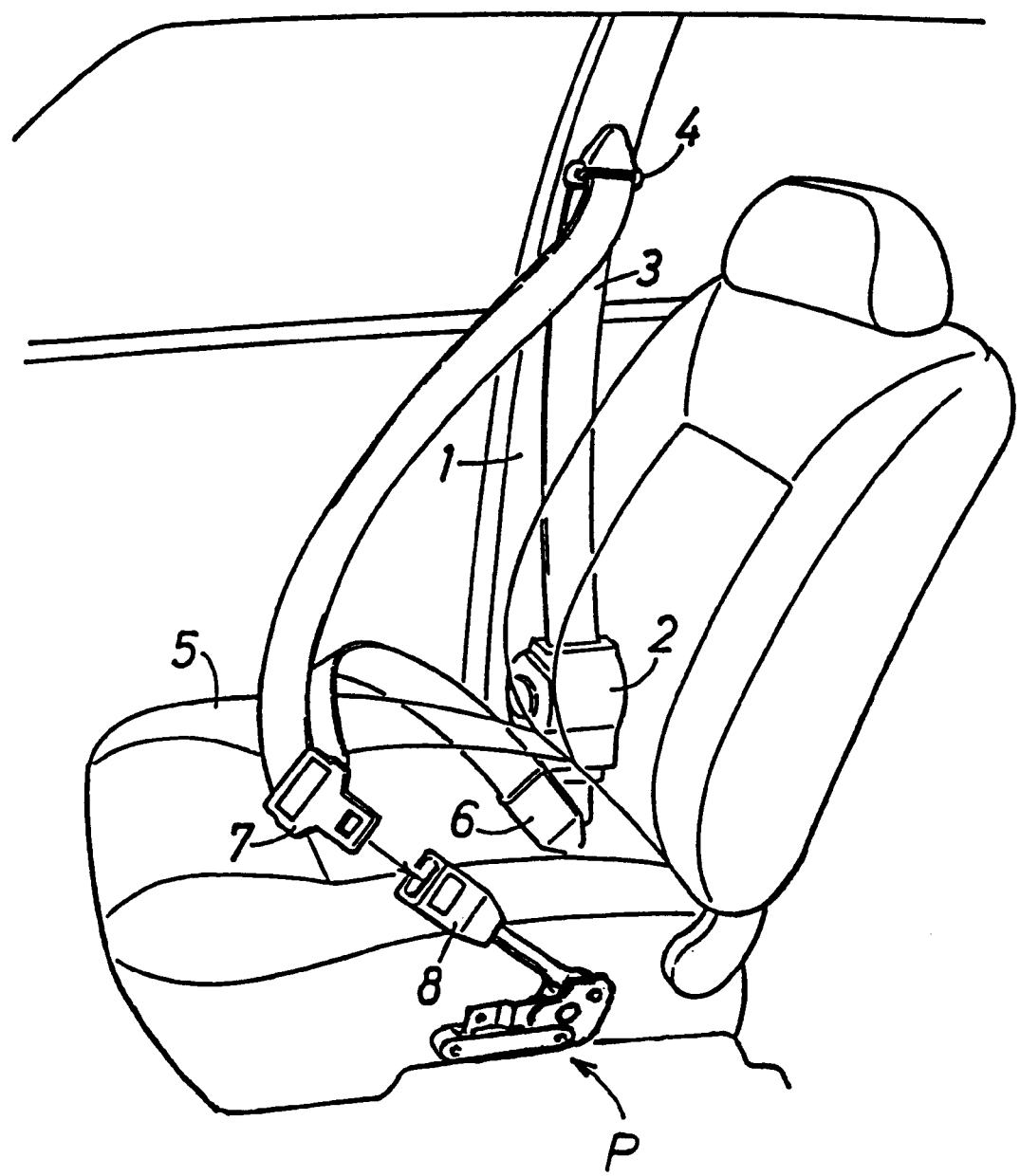
FIG. 1 is a perspective view of the surrounding part of a seat embodying the present invention.

FIG. 1 shows an arrangement surrounding the seat which embodies the present invention. Referring to FIG. 1, a seat belt 3 pulled out upward from an ELR device 2 fixedly attached to a lower part of a center pillar 1 inside the passenger compartment is passed through a through ring 4 attached to an upper part of the center pillar 1, and then extends downward. A free end 6 of the seat belt 5 is attached to a rear part of a side portion of a seat 5. A tongue plate 7 is provided in a part of the seat belt 3 located between the through ring 4 and the free end 6 so as to be slidable along the length of the seat belt 3. A buckle 8 is attached to the side of the seat remote from the point of attachment of the seat belt free via a pretensioner device P according to the present invention.

When a vehicle occupant who is seated in the seat 5 pulls out the seat belt 3 from the ELR device 2, and latches the tongue plate 7 in the buckle 8, the seat belt 3 is passed around the shoulder, chest and hip of the vehicle occupant as a result.

Figure 2:
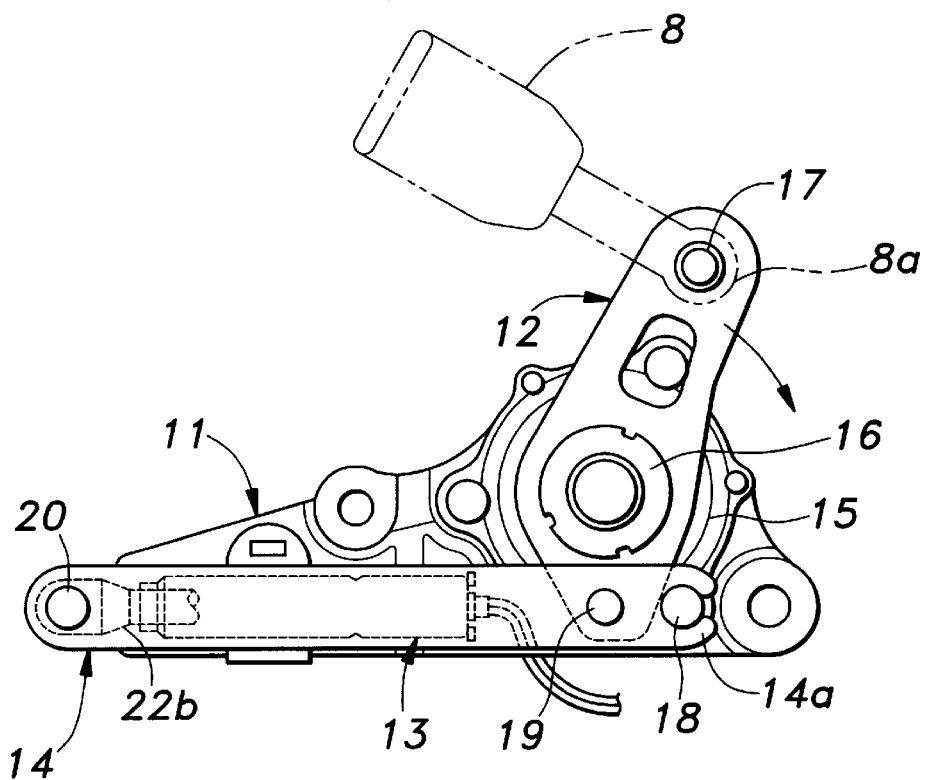
FIG. 2 is a side view of the pretensioner device for a seat belt according to the present invention.
Figure 3:
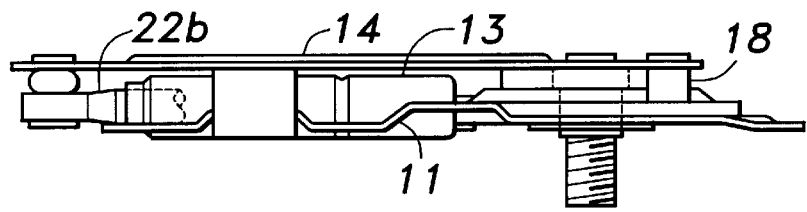
FIG. 3 is a bottom view of the pretensioner device for a seat belt according to the present invention.

The pretensioner device P is designed to automatically increase the tension of the seat belt 3 in case of a vehicle crash or the like, and as illustrated in FIGS. 2 and 3, comprises base plate 11 for fixedly attaching the entire assembly to a side of the seat 5, an arm 12, having one end pivotally attached to the base plate 11 and another end connected to an anchor portion 8a of the buckle 8, a linear actuator 13 serving as a power generator which is substantially fixedly attached to the base plate 11, a link member 14 having one end connected to the working end of the linear actuator 13 and another end connected to a part of the arm 12 via a pivot pin 19 at a certain radial distance from the pivot center of the arm 12, and a reversing preventing device 15 for restricting the direction of rotation of the arm 12 only to one direction. The reversing preventing device 15 may consist of a ratchet mechanism or other known one-way clutch arrangement.

The base plate 11 is fixedly provided with a center shaft 16 supporting the arm 12. The arm 12 is rotatably mounted on the center shaft 16, and has an anchor pin 17 fixedly attached to another end thereof by projection welding or the like. The anchor portion 8a of the buckle 8 is rotatably supported by the part of the anchor pin 17 projecting from a side of the arm 12. As can be readily appreciated, the pivot pin 19 should be located substantially diagonally opposite the anchor pin 17 with respect to the center shaft 16 which is the pivot center for the arm 12.

One end of the link member 14 is pivotally connected to a working end of the actuator 13 or the free end of a piston rod 22b which is described hereinafter, and a part near the other end of the link member 14 is pivotally connected to the arm 12. A C-shaped portion 14a on the other end of the link member 14 is fitted on a pin 18 which serves as a fuse for preventing inadvertent rotation of the arm 12.

Figure 4:
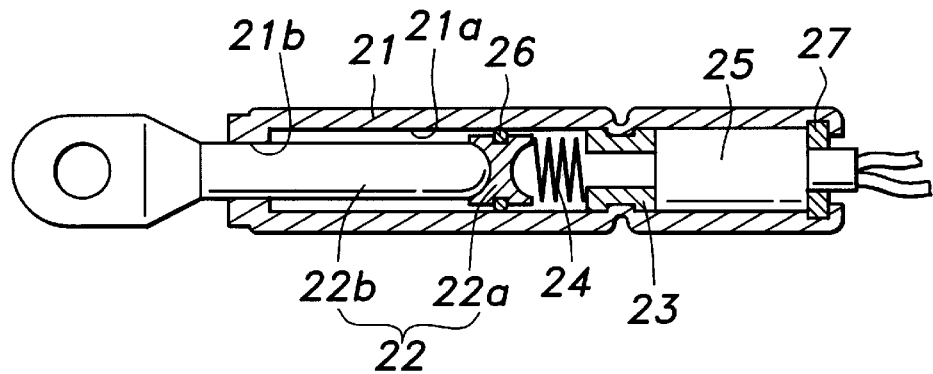
FIG. 4 is a sectional view of the power generator of the pretensioner device for a seat belt according to the present invention.
Figure 5:
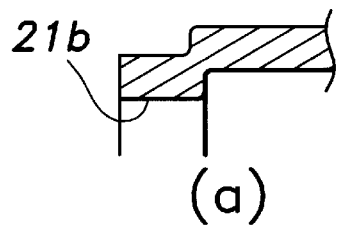
FIGS. 5(a) to 5(d) are enlarged fragmentary views of possible different shapes of the open working end of the cylinder shown in FIG. 4.
Figure 5:
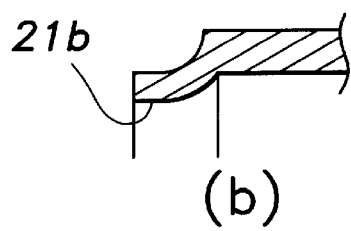
Figure 5:
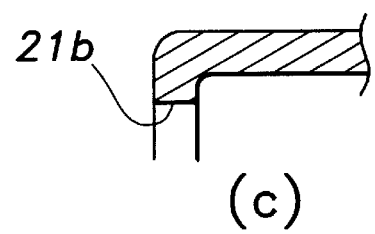
Figure 5:
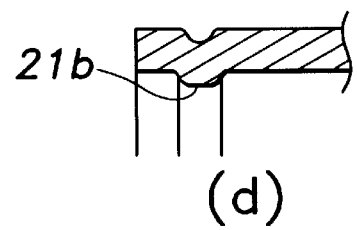

Referring to FIG. 4, the actuator 13 comprises a cylinder 21 which is fixedly attached to the base plate 11, a piston main body 22a which is received from the working end of the inner bore 21a of the cylinder 21, and a gas generator 25 received in the base end of the cylinder inner bore 21a. A collar 23 is interposed between the piston main body 22a and the gas generator 25, and fixedly retained therein by crimping the material of the cylinder 21 thereon. A compression coil spring 24 is interposed between the collar 23 and the piston main body 22a for normally urging the piston main body 22a toward the direction of actuation.

The piston main body 22a engages the wall surface of the inner bore 21a via an O-ring 26. The piston rod 22b having the free end which is connected to the link member 14 abuts the piston main body 22a from the axial direction so as to jointly form a piston assembly 22. The piston main body 22a and the piston rod 22b engage each other via a coaxial concave portion defined by a curved surface having a certain curvature and a coaxial convex portion having a slightly smaller curvature. As these two parts centrally abut each other and are thereby automatically aligned with each other, the twisting of the piston rod 22b inside the cylinder 21 can be avoided, and it contributes to the elimination of energy loss and gas leakage due to axial offsetting. In practice, the curved surface may be replaced with a tapered surface, and, in this case, the taper of the convex portion should be more gradual than that of the concave portion.

By normally urging the piston main body 22a in the direction of actuation with the compression coil spring 24, the piston rod 22b is also urged in the direction of actuation, and the play that may be present between the piston rod 22b and the link member 14 and between the link member 14 and the arm 12 can be eliminated. The compression coil spring may consist of other spring members such as dish springs, rubber members and so on.

The opening 21b on the working end of the cylinder 21 is reduced in diameter by swaging so as to engage the outer circumferential surface of an intermediate part of the piston rod 22b. The shape of this reduced diameter portion may be formed as shown in FIGS. 5(a) to 5(d) in cross section. The example illustrated in FIG. 5(d) involves the use of crimping which may either extend over the entire circumference or be limited to localized parts. The opening 21b which is reduced in diameter prevents the piston main body 22a from moving out from the open free end of the cylinder 21 on the one hand, and provides a bearing surface for the cylinder rod 22b as the piston assembly 22 moves.

The actuator 13 can be assembled from the end of the cylinder 21 remote from the open working end 21b or from the open base end as described in the following. The collar 23 is properly positioned inside the cylinder 21, and the material of the cylinder 21 is crimped upon the collar 23. The compression coil spring 24 and the piston main body 22a are inserted from the left end as seen in FIG. 4. The gas generator 25 is installed from the base end or the right end as seen in FIG. 4, and the open base end of the cylinder 21 is crimped onto a retaining plate 27 serving also as a seal member. In this manner, the assembling can be conducted from one direction, and the assembling work is therefore significantly simplified.

At this point, the piston rod 22b is not installed in the actuator 13, and may be treated as a separate component part. Therefore, even when the gas generator 25 is inadvertently activated for some reason, it only causes the piston main body 22a to move inside the cylinder, and would not create any handling problems. Because the piston main body 22a is highly light in weight, there is no need to install a strong cap on the open working end 21b of the cylinder 21. The open working end 21b of the cylinder 21 is only required to be reduced in diameter which would not increase the radial profile of the assembly and contributes to reducing the overall weight of the assembly. Thus, the overall profile of the pretensioner device is minimized while providing the advantages of increased freedom in layout and simplicity of assembling work. The elimination of the need for machining owing to the absence of a cap adds to the simplification of the work involved in the production of the cylinder.

When installing this actuator 13 into the pretensioner device P, the cylinder 21 is fixedly attached to the base plate 11, and, then, the piston rod 22b is inserted from the open working end 21b of the cylinder 21. The free end of the piston rod 22b is connected to the link member 14 via a pin 20.

At this time, the point of connection (the pin 20) between the free end of the piston rod 22b and the link member 14 is defined at a point somewhat offset in the direction of the actuation of the piston rod 22b so that the dimensional errors of the component parts of the pretensioner device and the positional error of the assembled link member, that may be present, may be accommodated by adjusting the position of the piston rod 22b in the cylinder bore 21a. Furthermore, because these parts are urged in the direction of actuation by the compression coil spring 24, the possibility of producing any play is eliminated. Also, because the piston main body 22a is spaced from the end surface of the collar 23, the pressure receiving surface is increased over the case where the piston main body 22a is in close contact with the end surface of the collar 23 so that the desired action can be achieved with a minimum amount of gas propulsion. This in turn reduces the need for the mechanical strength of the cylinder so that the wall thickness of the cylinder can be reduced, and the overall weight can be reduced.

Figure 6:
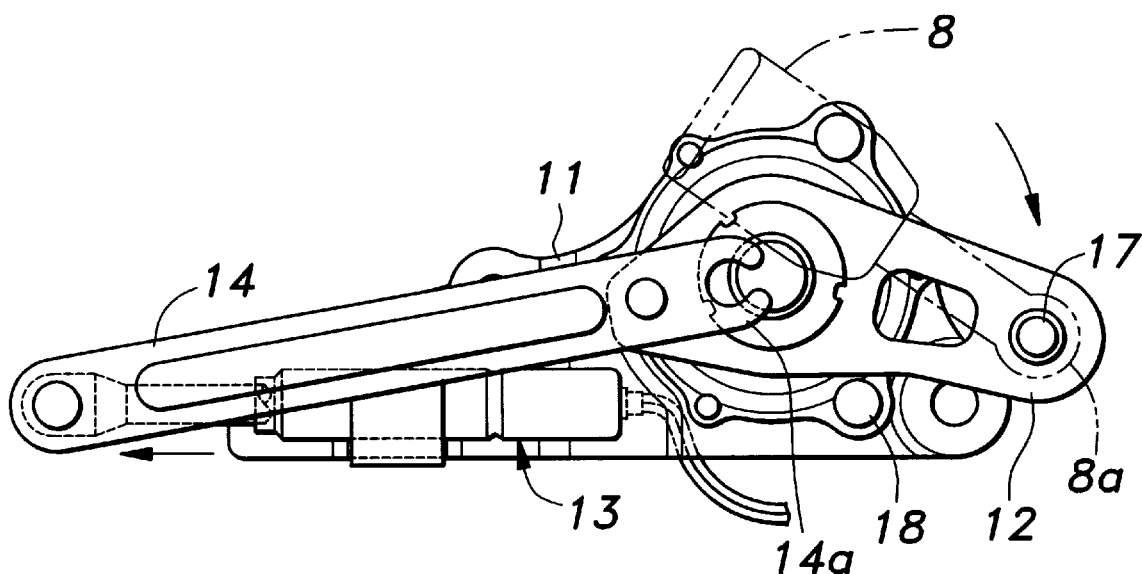
FIG. 6 is a view for describing the mode of operation of the device of the present invention.
Figure 7:
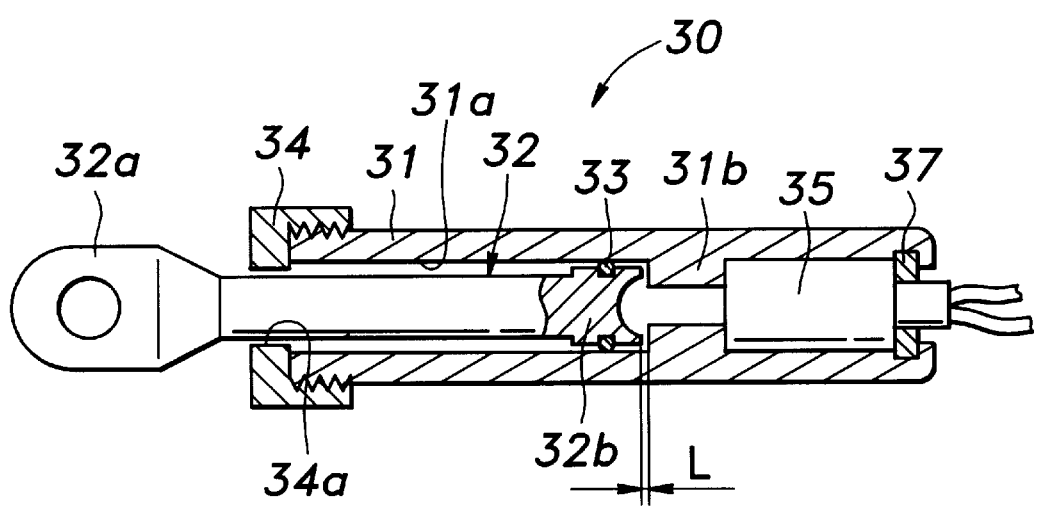
FIG. 7 is a sectional view similar to FIG. 4 showing the structure of the power generator of the conventional pretensioner device for a seat belt.

The mode of operation of this embodiment is described in the following. First of all, when a vehicle crash is detected by a deceleration sensor (not shown in the drawings), the propellant in the gas generator 25 is ignited, and the thrust of the piston assembly 22 resulting from the subsequent buildup of the pressure of the combustion gas is transmitted to the arm 12 via the link member 14 as a rotary motion thereof. The rotation of the arm 12 in turn causes the buckle 8 to be pulled in (see FIG. 6), and the resulting increase in the tension of the seat belt 3 enhances the capability of the seat belt 3 to restrain the vehicle occupant. Even after the pressure of the combustion gas has been lost, the reversing preventing device 15 prevents the reversing of the arm 12 or the slackening of the seat belt 3.

Thus, according to the present invention, in a power generator including a fixed cylinder, a piston assembly received in the inner bore of the cylinder and having one end which projects from an open one end of the cylinder and engages a buckle either directly or indirectly, and a gas generator for rapidly increasing the inner pressure of the cylinder, because the piston member is resiliently urged in the direction to project, the dimensional errors of the component parts and the positional errors that may occur during assembly can be readily absorbed, and the assembly work is simplified. Also, once fully assembled, the play that may exist between the component parts can be absorbed so that the collision of adjacent parts in the power transmission mechanism can be avoided, and the energy loss of the high pressure gas can be minimized. This allows the device to be compact and light-weight as a whole. Additionally, if the piston assembly consists of a piston main body which is dimensioned so as not to project from the cylinder even after activation, and a piston rod which has a base end detachably engaging the piston main body from the open one end and a free end engaging the buckle, the handling of the device can be improved because the power generator can be handled for storage and transportation without installing the piston rod, and the inadvertent actuation of the gas generator for any reason merely causes the piston main body to move within the cylinder.

Although the present invention has been described in terms of a preferred embodiment thereof, it is obvious to a person skilled in the art that various alterations and modifications are possible without departing from the scope of the present invention which is set forth in the appended claims.

What is claimed is:

1. In a pretensioner device for automatically increasing a tension of a seat belt in case of a vehicle crash by moveably supporting a seat belt buckle, moving the buckle in the direction to tension the seat belt with a power generator, and preventing a reversing movement of the buckle with a reversing preventing device, said power generator comprises:

a fixed cylinder;
   a piston assembly which is received in said cylinder and projects from an open free end of the cylinder at a free end thereof to either directly or indirectly engage the buckle;

gas generator received in a base end of said cylinder remote from said open free end for selectively and rapidly increasing the inner pressure of said cylinder; and a spring member which resiliently urges a part of said piston assembly in a direction of actuation of said piston assembly.

2. A pretensioner device according to claim 1, wherein said cylinder comprise an annular collar fitted inside said cylinder, and said spring member comprises a compression coil spring interposed between an annular shoulder defined by said annular collar and a base end of said piston assembly.

3. A pretensioner device according to claim 1, wherein said piston assembly comprises a piston main body slidably received inside said cylinder, and a piston rod having a base end abutting an opposing end of said piston main body and a free end projecting out of said open free end of said cylinder.

4. A pretensioner device according to claim 3, wherein said open free end of said cylinder comprises an inwardly directed radial flange which prevents removal of said piston main body from said open free end of said cylinder.

5. A pretensioner device according to claim 4, wherein said inwardly directed radial flange additionally provides a bearing surface for said piston rod.

6. A pretensioner device according to claim 3, wherein said piston main body and said piston rod abut each other via a coaxial concave surface and a coaxial convex surface having a smaller curvature than said concave surface.

* * * * *